3,190,842
PREPARATION OF OPEN CELL POLYURETHANE FOAM HAVING AN INERT LIQUID ENTRAPPED THEREIN
Arthur F. Ringwood, Schenectady, and Charles T. Boutin, Cohoes, N.Y., assignors to General Electric Company, a corporation of New York
No Drawing. Filed Aug. 11, 1960, Ser. No. 48,858
3 Claims. (Cl. 260—2.5)

This invention relates to foamed resinous liquid reservoirs. More particularly, the invention relates to polyurethane foams having as an integral part thereof liquids which are combined with the polyurethane during the foaming operation.

The use of resinous foams as reservoirs for liquids is well known. For example, polyvinylchloride foams have been used as reservoirs for the various liquids which are placed therein after the formation of the foam. However, such vinyl materials require that the foam structure be fused at elevated temperatures, which may be as high as 185° C. Other foam materials can be used as reservoirs for liquids, including epoxy resins, cellulose acetate, polyethylene, polystyrene and silicone type materials. However, all of the above materials with the exception of the polyvinyl material have an essentially rigid structure and the cells of foam so made are almost entirely closed. This means that such foams would have to be punctured in order to allow access of a liquid and, conversely, would also have to be punctured to allow the liquid to be made available from the foam. The rigidity of the foams tends to make them friable, particularly in thin sections, and thus they cannot be used in many applications where it is required that the foam remain in one piece. This is particularly important in applications such as bearing lubricating applications where the end-bell of a motor may be packed with foam, having an oil therein, any pieces breaking off of the foam tending to jam any bearing. A major disability of the above foamed resins as a reservoir for liquids lies in their largely closed cell structure, and it is an object of this invention to provide foamed resinous materials and structures which contain a liquid which is placed therein during the formation or before the formation of the foam itself and which thereafter is readily available at the surface of the foam. The liquid which is entrapped within the cells of such foamed materials and structures is referred to hereinafter as "integral liquid."

Briefly stated, the present invention comprises polyurethane foams of the usual type, which have incorporated therein desired liquids, it having been found unexpectedly that such polyurethane foams with integral liquid have a large percentage of open cells therein. The liquid tends to prevent a blocking skin at the surfaces of the polyurethane foam and the openings in the cells are so minute that a capillary metering action is obtained which permits gradual feeding of the liquid from the cell. Furthermore, polyurethane foams may be made in any physical stiffness desired—rigid, semi-rigid, and flexible. The flexible types are preferred because of the higher percentage of open cells characteristic thereof. The flexible type polyurethane foams are also preferred because they can act as sound dampers and vibrational energy absorbers where indicated. There is thus less likelihood of any vibrational energies breaking loose fragments of foam which may fall into a bearing race, and the like.

The foams of this invention may be made in various well-known manners. For example, they may be made by the so-called one-shot method and also by the so-called prepolymer method. In the one-shot method, a suitable amount of diisocyanate is reacted with a selected polyether or polyester resin, which resin has been properly catalyzed. In the prepolymer systems, the isocyanate has previously been reacted with the resin either completely or partially to form a so-called prepolymer, which latter is then foamed by adding thereto the catalyst. In many respects, the prepolymer foaming methods are advantageous over the one-shot method inasmuch as there is thus eliminated inplant handling of toxic isocyanates. Furthermore, the lower exotherm associated with the prepolymer foaming method eliminates the danger of internal charring of the foam mass.

Among the diisocyanates which are useful in connection with the present invention are the alkylene diisocyanates, such as ethylene diisocyanate, trimethylene diisocyanate, hexamethylene diisocyanate, propylene-1,2-diisocyanate, and ethylidene diisocyanate. Cyclo-alkylene diisocyanates are also useful, such as cyclo-pentylene diisocyanate, aromatic diisocyanates, such as tolylene diisocyanate, naphthylene diisocyanate, 1,4-phenylene diisocyanate, aliphatic aromatic diisocyanates, such as ethylene-1,4-diisocyanate, aromatic aliphatic diisocyanates, such as 1-phenyl-1,3-diisocyanate, etc. Among the polyethers which are useful in connection with the present invention are the reaction products of propylene oxide and glycerine, propylene oxide and propylene glycol, mixed propylene and ethylene oxides and propylene glycol and mixed propylene and ethylene oxides and ethylene diamine. The polyether based foams at this time can only be produced by the two-step or prepolymer method. Thus, the polyether is reacted with the isocyanate in the presence of an inert atmosphere. Certain types of catalysts and triols (for increased functionality) can be added to this reaction mixture. Other types can be added to the final formulation for foaming. The foaming process is achieved by mixing the required amount of prepolymers with the required amount of catalyst mix. The usual polyesters are useful in connection with the present invention, such polyesters being typified by the esterification products of dicarboxylic acids, such as adipic and phthalic and dihydroxy alcohols or glycols, such as glycerine, ethylene glycol, propylene glycol. Mixtures of the acids may be reacted with the glycol or mixtures of the glycols in order to obtain different viscosities and molecular weights thereby giving final foam products of various flexibilities and densities. For example, 100 parts by volume of a polyester composed of 16 moles of adipic acid, 16 moles of diethylene glycol and 1 mole of trimethylol propane are reacted with 47 parts by volume of tolylene diisocyanate in the presence of 10 parts by volume of an activator mix of the composition by weight—three parts of the adipic acid ester of N-diethylaminoethanol, one part ammonium oleate, 1.5 parts sulphonated castor oil, 1.5 parts water, and 0.5 part paraffin to produce a flexible polyurethane foam of approximately 2.2 pounds per cubic foot density. This represents a so-called "one-shot" method. It will be recognized that there are many well-known combinations of reactants to produce the polyester. There are also various quantities of isocyanates that can be reacted with the different polyesters in the presence of various quantities of many activator mixes of amine catalysts, wetting or dispersing agents and water.

In lieu of the above methods of making the polyurethanes, it will be realized, of course, that they can be made by coupling an amine and an alcohol with phosgene to produce urethane, which latter is then reacted with glycols or polyols and diamines to form the polyurethane. It is preferable to react first an alcohol with phosgene and then with an amine to form the corresponding urethane, which is then reacted with polyols and diamines to form the polyurethane. This latter method avoids the use of toxic diisocyanates.

A typical polyurethane foam of the present invention is formed from an isocyanato terminated polyester resin of the adipic acid type, along with up to 10 parts by weight per 100 parts by weight of polyester of a polyol such as ethylene glycol, propylene glycol, castor oil, glycerine, etc., and mixtures thereof, which increases the reactivity and flexibility, and an amine catalyst in a mixture of about 1 to 10 parts of a 50–50 by weight each of amine and water. Such amines include piperidine, pyridine, dibutylamine, triethylamine, diethylamine, triethanolamine, morpholine, trimethylamine, diethanolamine, and the like. Wool felt can be added to the composition in amounts of up to 10 parts by weight per 100 parts by weight of resin in order to increase the liquid-absorbing capacity of the foam. Other fibrous materials or fillers may also be added in like amounts for such purpose, such as sisal, cellulose, etc. A typical composition, Example 1, consists of, by weight, 100 parts of isocyanato terminated polyester, 3.5 parts of a 50–50 by weight mixture of an amine catalyst-water mixture, 5 parts of aluminum stearate, 100 parts of lubricating oil. The aluminum stearate which can be added in amounts of up to 15 parts by weight per 100 parts by weight or resin adds body to the oil, improving its retention in the foam structure, although it may be omitted from the formulation with no effect on the basic performance of the foam reservoir. The oil which may be vegetable, mineral or synthetic in nature can be added in amounts of from about 30 to 100 parts by weight per 100 parts by weight of resin. The above composition is placed in a suitable mold, the amine and water catalyst mix added thereto, after which the composition foams, retaining the oil lubricant intimately in place in the cell of the resinous foam. A second foamed material, Example 2, was prepared as in the first example, except that five parts of chopped sisal fiber per 100 parts by weight of resin were added, the sisal material serving as a wick to enhance the feeding of the oil throughout the foam. Still another example, Example 3, was similarly prepared, except that five parts of wool fiber flock were used in lieu of the sisal. A fourth exemplary material, Example 4, was similarly prepared, except that five parts by weight of alpha cellulose was used in lieu of the sisal fiber.

Oil-loaded polyurethane foams are particularly useful in lubricating applications, such as in the bearings of electric motors. Thus, in such an application, the foam can be formed in the end-bell of the motor adjacent to the bearing, affording a continuous supply of oil for lubrication of the bearing. The aluminum stearate and oil are mixed at room temperature and heated to about 150° C., then cooled to room temperature whereupon the urethane resin is blended therein with the catalyst, to bring about the foaming action.

When a mixture such as that of Example 1 above was foamed in the end-bell of a standard ¼ H.P. motor and put on test without any bearing relubrication of any kind, the motor ran for over 20,000 hours without any sign of difficulty whatsoever. On the other hand, a motor having a conventional felt wicked oil bearing failed after several hundred hours' operation.

While the invention has been described with particular reference to oil-loaded polyurethane foam, it will be realized that other liquids may as well be used so long as they are compatible with the resinous material itself. Thus, ink compositions of various types may be foamed in a polyurethane film to form a self-replenishing ink pad. For example, a foam was prepared as in Example 1 above, except that 50 parts by weight of ordinary stamp pad ink was used in lieu of the oil, the foam so produced serving as a long-lasting, continuously replenishing ink pad. Other applications for the invention include a long-lasting lubricating system for the journal bearings on freight trains to replace the present oil-soaked cotton "waste." A lubricant can thus be provided for heavy rolling equipment such as in steel mills, paper mills, etc. to replace the present solid type lubricating blocks which soften and wear with increased heat. A single unit mucilage dispenser can be made of the present form to replace the present brush and reservoir type which requires frequent cleaning and refilling from a stock bottle. A non-adherent type space filler or potting compound which can be easily removed, thereby allowing replacement or repair of components in electronic or electrical devices, can also be easily prepared as from the materials described herein. Furthermore, paints, lacquers, varnishes and enamels of various types may be formed, for example, in a polyurethane foam having a roller form, such roller then used to apply the coating material to any surface as desired.

What we claim as new and desire to secure by Letters Patent of the United States is:

1. A method of forming a body of substantially open cell polyurethane foam material containing from about 30 to 100 parts by weight of an integral liquid per 100 parts by weight of polyurethane, said liquid being chemically nonreactive with respect to the polyurethane, comprising the steps of mixing said liquid with an organic polyisocyanate and a reactive organic material selected from the group consisting of polyethers and polyesters, and reacting said mixture in a suitable mold in the presence of an amine catalyst mixture of about 1 to 10 parts per 100 parts by weight of the polyisocyanate and the reactive material of a mixture of a 50 to 50 parts by weight each of amine and water to form said open cell polyurethane foam and simultaneously entrapping said liquid in the cells of said foam.

2. The method as recited in claim 1 in which said reacting mixture includes per 100 parts by weight of the polyurethane up to about 10 parts by weight of a fibrous absorbent material, up to 10 parts by weight of a polyol selected from the group consisting of ethylene glycol, propylene glycol, castor oil, glycerine, and mixtures thereof, up to 15 parts by weight of aluminum stearate, and said integral liquid is a lubricating oil.

3. The method as recited in claim 2 in which said fibrous absorbent material is selected from the group consisting of wool felt fiber, cellulose fiber, and mixtures thereof.

References Cited by the Examiner

UNITED STATES PATENTS

| 2,577,281 | 12/51 | Simon et al. | 260—2.5 |
| 2,726,219 | 12/55 | Hill | 260—2.5 |
| 2,777,824 | 1/57 | Leeds | 260—2.5 |
| 2,921,916 | 1/60 | Harrison et al. | 260—2.5 |
| 2,962,746 | 12/60 | Heroy et al. | 260—2.5 |
| 2,964,424 | 12/60 | Mast | 260—2.5 |
| 2,977,330 | 3/61 | Brower | 260—2.5 |

FOREIGN PATENTS

| 563,932 | 7/58 | Belgium. |
| 1,065,962 | 9/59 | Germany. |
| 716,422 | 10/54 | Great Britain. |

LEON J. BERCOVITZ, *Primary Examiner.*

D. ARNOLD, *Examiner.*